(12) United States Patent
Ajito

(10) Patent No.: US 10,158,804 B2
(45) Date of Patent: Dec. 18, 2018

(54) IMAGING DEVICE, CONTROL METHOD AND RECORDING MEDIUM HAVING STORED PROGRAM

(71) Applicant: Olympus Corporation, Hachioji-shi, Tokyo (JP)

(72) Inventor: Takeyuki Ajito, Tokyo (JP)

(73) Assignee: Olympus Corporation, Tokyo (JP)

( * ) Notice: Subject to any disclaimer, the term of this patent is extended or adjusted under 35 U.S.C. 154(b) by 18 days.

(21) Appl. No.: 15/588,501

(22) Filed: May 5, 2017

(65) Prior Publication Data
US 2017/0347031 A1 Nov. 30, 2017

(30) Foreign Application Priority Data
May 31, 2016 (JP) .................................. 2016-109247

(51) Int. Cl.
*H04N 5/232* (2006.01)
*H04N 5/235* (2006.01)

(52) U.S. Cl.
CPC ....... *H04N 5/23287* (2013.01); *H04N 5/2356* (2013.01); *H04N 5/23212* (2013.01); *H04N 5/23216* (2013.01); *H04N 5/23232* (2013.01); *H04N 5/23293* (2013.01)

(58) Field of Classification Search
CPC ............. H04N 5/23287; H04N 5/2356; H04N 5/23232; H04N 5/23293; H04N 5/23212; H04N 5/23216; H04N 5/23261; H04N 5/23248; G06T 5/006
See application file for complete search history.

(56) References Cited

U.S. PATENT DOCUMENTS

| 8,023,000 B2 | 9/2011 | Tamaru | |
|---|---|---|---|
| 9,294,679 B1* | 3/2016 | Hodges | H04N 5/23293 |
| 2002/0118292 A1* | 8/2002 | Baron | H04N 5/2259 348/335 |
| 2010/0128163 A1* | 5/2010 | Nagasaka | H04N 5/23212 348/348 |
| 2015/0138383 A1* | 5/2015 | Kelley | G06T 5/006 348/208.6 |

(Continued)

FOREIGN PATENT DOCUMENTS

| JP | 2000-013665 | 1/2000 |
|---|---|---|
| JP | 2003-348430 | 12/2003 |

(Continued)

*Primary Examiner* — Albert H Cutler
(74) *Attorney, Agent, or Firm* — John C. Pokotylo; Pokotylo Patent Services

(57) ABSTRACT

An imaging device performs live view control in which control of imaging a subject image formed by a focusing lens so as to output image data, generating tilt-distortion correction image data in accordance with the tilt-distortion correction level on the basis of the image data, and displaying a tilt-distortion correction image represented by the tilt-distortion correction image data is performed repeatedly, and performs focus bracket control in which control of moving the focusing lens to each of a plurality of lens positions determined on the basis of the tilt-distortion correction level and imaging a subject image formed by the focusing lens so as to output image data when the focusing lens has moved to each of the plurality of lens positions is performed.

6 Claims, 20 Drawing Sheets

(56) References Cited

U.S. PATENT DOCUMENTS

| | | | |
|---|---|---|---|
| 2016/0112652 A1* | 4/2016 | David | H04N 1/3877 348/239 |
| 2016/0205308 A1* | 7/2016 | Maeda | H04N 1/00129 348/207.11 |
| 2017/0078577 A1* | 3/2017 | Wakamatsu | H04N 5/23287 |
| 2017/0352132 A1* | 12/2017 | Zhang | G06T 5/001 |

FOREIGN PATENT DOCUMENTS

| | | |
|---|---|---|
| JP | 2008-271240 | 11/2008 |
| JP | 2010-210671 | 9/2010 |
| JP | 2011-041092 | 2/2011 |

\* cited by examiner

| TYPE | TILT ANGLE | PROJECTION TRANSFORM FORMULA |
|---|---|---|
| ⬜ | $\beta_1$ | $\begin{bmatrix} x \\ y \\ 1 \end{bmatrix} = \begin{pmatrix} a_1 & b_1 & c_1 \\ d_1 & e_1 & f_1 \\ g_1 & h_1 & 1 \end{pmatrix} \begin{bmatrix} X \\ Y \\ 1 \end{bmatrix}$ |
| ⬜ | $\beta_2$ | $\begin{bmatrix} x \\ y \\ 1 \end{bmatrix} = \begin{pmatrix} a_2 & b_2 & c_2 \\ d_2 & e_2 & f_2 \\ g_2 & h_2 & 1 \end{pmatrix} \begin{bmatrix} X \\ Y \\ 1 \end{bmatrix}$ |
| ⬜ | $\beta_3$ | $\begin{bmatrix} x \\ y \\ 1 \end{bmatrix} = \begin{pmatrix} a_3 & b_3 & c_3 \\ d_3 & e_3 & f_3 \\ g_3 & h_3 & 1 \end{pmatrix} \begin{bmatrix} X \\ Y \\ 1 \end{bmatrix}$ |
| ... | ... | ... |
| ... | ... | ... |
| ... | ... | ... |
| ... | ... | ... |

F I G. 6

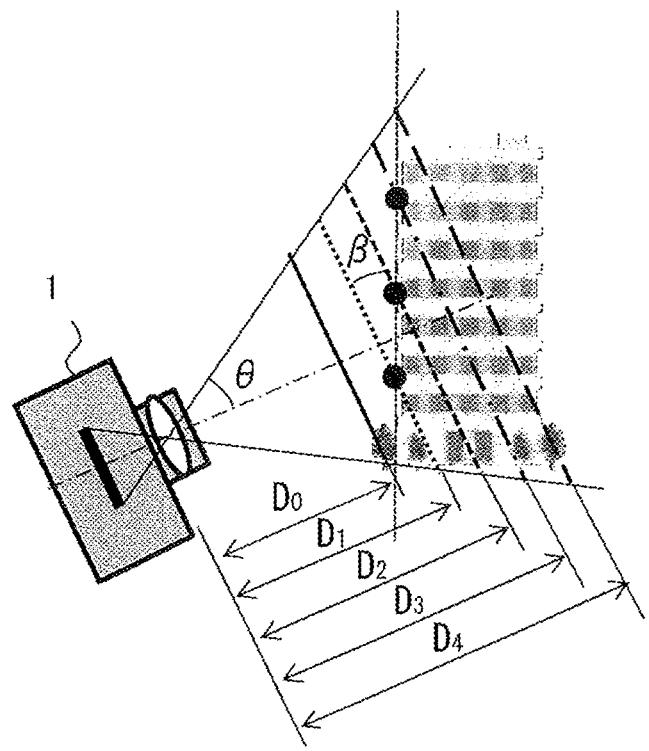
F I G. 14

IMAGING DEVICE, CONTROL METHOD AND RECORDING MEDIUM HAVING STORED PROGRAM

CROSS-REFERENCE TO RELATED APPLICATIONS

This application is based upon and claims the benefit of priority of the prior Japanese Patent Application No. 2016-109247, filed May 31, 2016, the entire contents of which are incorporated herein by reference.

FIELD

The present invention is related to an imaging device having a tilt-distortion correction function, a control method of such an imaging device, and a recording medium having stored a program used by such an imaging device.

BACKGROUND

Cameras having a function of correcting, through an image process, distortion of a subject in an image resulting from performing photography in an upward direction to obtain an image of a building etc. (so-called tilt photography) have conventionally been known (see Japanese Laid-open Patent Publication No. 2003-348430 for example).

Also, in recent years, cameras having a function of reflecting a tilt-distortion correction on the live view image, which is displayed in real time, are also known, the tilt-distortion correction being in accordance with the user setting. With this type of camera, the user can obtain an image on which a desired tilt-distortion correction has been reflected by adjusting a tilt-distortion correction level (tilt-distortion correction degree) while looking at the live view image before performing photography.

In some cases, this type of camera fails to bring the entire subject into focus because an image projection plane is tilted with respect to the subject in tilt photography as shown in for example FIG. 17. This may result in a case as shown in for example FIG. 18 in which an image not having the entire subject in focus (an image having part of the subject out of focus) is obtained even though distortion of the subject in the image has been corrected by a tilt-distortion correction.

Note that a camera having a lens shift mechanism as shown in for example FIG. 19 can perform photography while keeping the image projection plane parallel to the subject by using the lens shift mechanism. Accordingly, photography using this type of camera can generate an image not involving distortion of the subject and having the entire subject in focus as shown in for example FIG. 20.

Meanwhile, cameras that can generate natural images equivalent to those obtained through tilt photography in a simple manner are also known (see Japanese Laid-open Patent Publication No. 2010-210671 for example). This type of camera performs focus bracket photography four times while bringing four divisional areas (divisional areas in the photography window) into focus, the divisional areas corresponding to the tilt photography patterns selected by the user from among a plurality of tilt photography patterns. Then, the camera cuts out the divisional areas in focus from data of the obtained four images so as to generate synthetic image data.

Cameras that deform image data other than reference image data from among data of a plurality of images obtained through focus bracket photography so as to synthesize the deformed image data and the reference image data are also known (see Japanese Laid-open Patent Publication No. 2008-271240 for example).

SUMMARY

One aspect of the present invention provides an imaging device including an imaging unit, an input unit, a tilt-distortion correction image generation unit, a display panel, a live-view controller, and a focus bracket controller. The imaging unit is configured to output image data. The imaging unit includes a focusing lens, an image sensor, and a signal converter. The focusing lens is configured to move so as to form a subject image. The image sensor is configured to image a formed subject image so as to output an image signal. The signal converter is configured to convert the image signal into image data. The input unit is configured to input a tilt-distortion correction level. The tilt-distortion correction image generation unit is configured to generate tilt-distortion correction image data in accordance with the tilt-distortion correction level. The display panel is configured to display a tilt-distortion correction image represented by the tilt-distortion correction image data. The live-view controller is configured to issue a series of instructions for making the imaging unit output image data, making, on the basis of the image data, the tilt-distortion correction image generation unit generate tilt-distortion correction image data, and making a display panel display a tilt-distortion correction image represented by the tilt-distortion correction image data. The focus bracket controller is configured to instruct the focusing lens to move to each of a plurality of lens positions determined on the basis of the tilt-distortion correction level and instruct the imaging unit to output image data when the focusing lens has moved to each of the plurality of lens positions.

Another aspect of the present invention provides a control method of an imaging device, the method including inputting a tilt-distortion correction level, performing live view control in which control of imaging a subject image formed by a focusing lens so as to output image data, generating tilt-distortion correction image data in accordance with the tilt-distortion correction level on the basis of the image data, and displaying a tilt-distortion correction image represented by the tilt-distortion correction image data is performed repeatedly, and performing focus bracket control in which control of moving the focusing lens to each of a plurality of lens positions determined on the basis of the tilt-distortion correction level and imaging a subject image formed by the focusing lens so as to output image data when the focusing lens has moved to each of the plurality of lens positions is performed.

Still another aspect of the present invention provides a non-transitory computer-readable recording medium storing a computer program for causing a computer of an imaging device to implement an input function of inputting a tilt-distortion correction level of an image, a live view control function of repeatedly performing control of imaging a subject image formed by a focusing lens so as to output image data, generating tilt-distortion correction image data in accordance with the tilt-distortion correction level on the basis of the image data, and displaying a tilt-distortion correction image represented by the tilt-distortion correction image data, and a focus bracket control function of performing control of moving the focusing lens to each of a plurality of lens positions determined on the basis of the tilt-distortion correction level and imaging a subject image formed by the focusing lens so as to output image data when the focusing lens has moved to each of the plurality of lens positions.

BRIEF DESCRIPTION OF DRAWINGS

FIG. 6 schematically shows an example of a tilt-distortion correction table used when a tilt-distortion correction is performed;

FIG. 14 is a second view that explains an example of the depth synthesization process;

DESCRIPTION OF EMBODIMENTS

Figure 1:
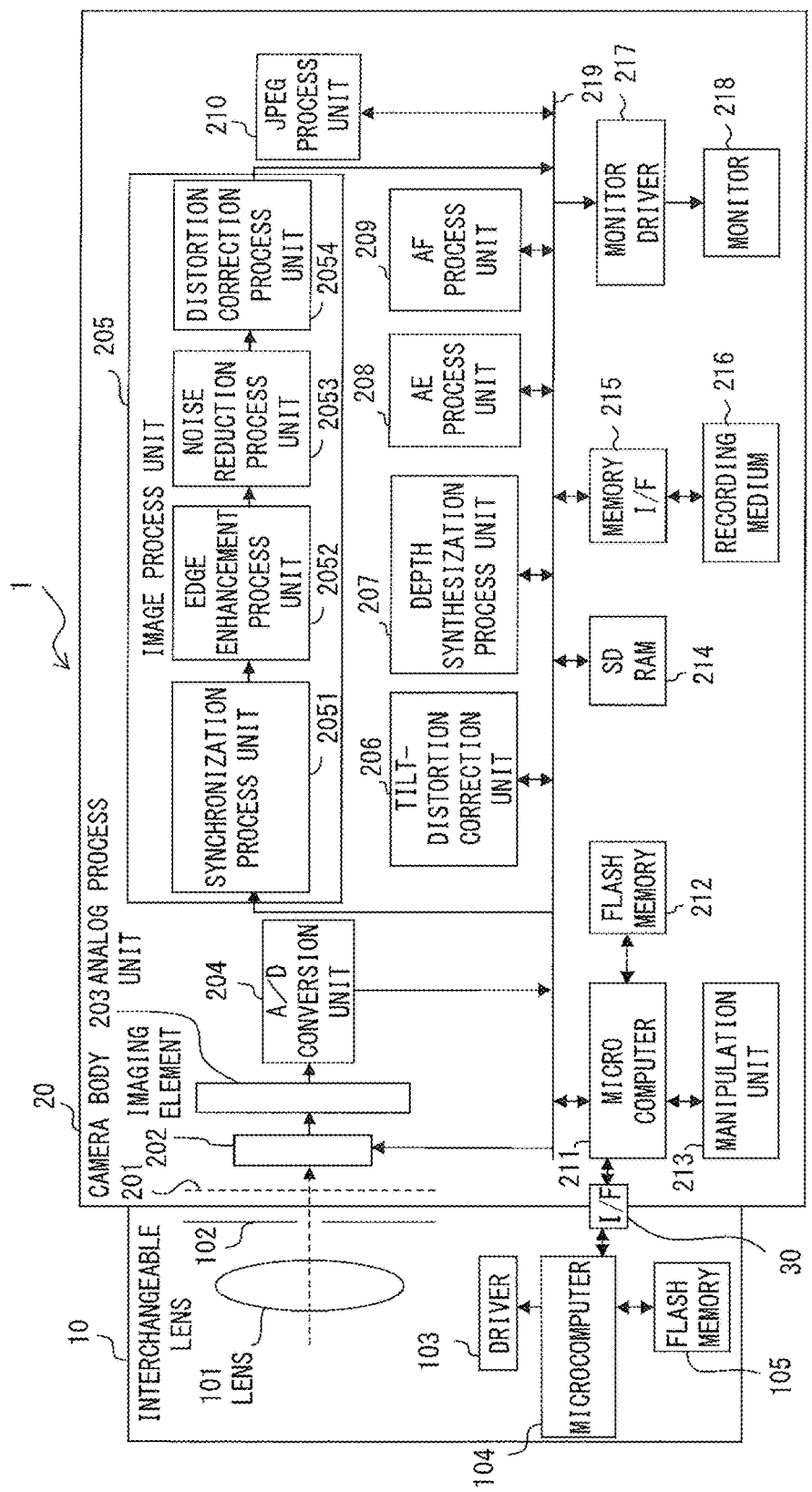
FIG. 1 shows a configuration example of a camera, which is an imaging device according to an embodiment of the present invention.

Hereinafter, the embodiments of the present invention will be explained by referring to the drawings.

FIG. 1 shows a configuration example of a camera, which is an imaging device according to an embodiment of the present invention.

While this camera is an interchangeable lens camera, it may be a camera with a fixed lens.

As shown in FIG. 1, the camera 1 has an interchangeable lens 10 and a camera body 20, and is configured so that the interchangeable lens 10 is removable from the camera body 20. When the interchangeable lens 10 is mounted on the camera body 20, the interchangeable lens 10 and the camera body 20 can perform communications via an I/F (interface) 30. The I/F 30 is configured to connect for example electric contacts that are provided to the interchangeable lens 10 and the camera body 20, when the interchangeable lens 10 is mounted on the camera body 20.

The interchangeable lens 10 includes a photography lens 101, a diaphragm 102, a driver 103, a microcomputer 104 and a flash memory 105.

The photography lens 101 is an optical system for condensing a light flux coming from the subject (not shown) to an image sensor 202 in the camera body 20, and includes a focusing lens. The photography lens 101 may include a zoom lens.

The diaphragm 102 is configured to open and close freely so as to adjust the amount of the light flux entering through the photography lens 101.

The driver 103 has a motor etc., and is a driving mechanism that, under control of the microcomputer 104, drives (moves) the focusing lens in the photography lens 101 in its optical axial directions and opens and closes the diaphragm 102.

The microcomputer 104 executes a program stored in the flash memory 105 so as to control operations of the interchangeable lens 10. For example, the microcomputer 104 performs, under control of a microcomputer 211 in the camera body 20, driving control of the focusing lens in the photography lens 101, the open-close driving control of the diaphragm 102, etc. during focus bracket photography, which will be described later.

The flash memory 105 stores a program executed by the microcomputer 104, data used for the execution of that program, etc.

The camera body 20 includes a mechanical shutter 201, an image sensor 202, an analog process unit 203, an A/D (Analog/Digital) conversion unit 204, an image process unit 205, a tilt-distortion correction unit 206, a depth synthesization process unit 207, an AE (Auto Exposure) process unit 208, an AF (Auto Focus) process unit 209, a JPEG (Joint Photographic Experts Group) process unit 210, a microcomputer 211, a flash memory 212, a manipulation unit 213, an SDRAM (Synchronous Dynamic Random Access Memory) 214, a memory I/F 215, a recording medium 216, a monitor driver 217, a monitor 218 and a bus 219.

The mechanical shutter 201 is configured to move freely so as to bring the photoelectric conversion plane of the image sensor 202 into a light-blocked state or an exposed state. By moving this mechanical shutter 201, the exposure time of the image sensor 202 is adjusted. Note that the mechanical shutter 201 is for example a focal plane shutter.

The image sensor 202 has a photoelectric conversion plane on which a light flux from the subject that was condensed by the photography lens 101 is formed. The photoelectric conversion plane includes a plurality of pixels that are arranged in two dimensions. Also, the light-entering side of the photoelectric conversion plane has a color filter in for example a Bayer array. This image sensor 202 converts an image (subject image) corresponding to the light flux formed on the photoelectric conversion plane into an electric signal corresponding to the light amount of the light flux (which will be referred to as an image signal hereinafter) in order to output the resultant signal. In other words, the image sensor 202 picks up the subject image formed on the photoelectric conversion plane so as to output an image signal corresponding to the subject image. Also, the image sensor 202 has an electronic shutter function that controls the exposure time electronically. The image sensor 202 is for example an image sensor such as a CCD (Charge Coupled Device), a CMOS (Complementary Metal Oxide Semiconductor), etc.

The analog process unit 203 performs an analog process such as a CDS (Correlated Double Sampling) process, an AGC (Automatic Gain Control) process, etc. on an image signal output from the image sensor 202.

The A/D conversion unit 204 converts an image signal that received an analog process by the analog process unit 203 into a digital signal (which will be referred to as RAW image data hereinafter). Note that RAW image data is "raw" image data before receiving an image process by the image process unit 205.

The analog process unit 203 and the A/D conversion unit 204 function as a signal converter that converts an image signal output from the image sensor 202 into image data.

The image process unit 205 performs various types of image processes on RAW image data so as to generate to-be-recorded image data (such as focus bracket image data) or to-be-displayed image data (such as live view image data). Note that different parameters were used in the image processes between to-be-recorded image data and to-be-displayed image data.

In more detail, the image process unit 205 includes a synchronization process unit 2051, an edge enhancement process unit 2052, a noise reduction process unit 2053 and a distortion correction process unit 2054.

The synchronization process unit 2051 converts image data, such as RAW image data etc. output via the image sensor 202 and corresponding to for example a Bayer array, in which one pixel corresponds to one color component into RGB image data in which one pixel corresponds to a plurality of color components.

The edge enhancement process unit 2052 extracts a plurality of frequency component signals (edge signals) from RGB image data so as to correct the frequency characteristic of each of the extracted edge signals.

The noise reduction process unit 2053, using a coring process etc., removes noise components in RGB image data.

The distortion correction process unit 2054 corrects distortion based on the distortion aberration of the photography lens 101 in the RGB image data.

Note that to-be-recorded image data or to-be-displayed image data generated by the image process unit 205 is also RGB image data after receiving the processes by the respective process units in the image process unit 205.

Figure 17:
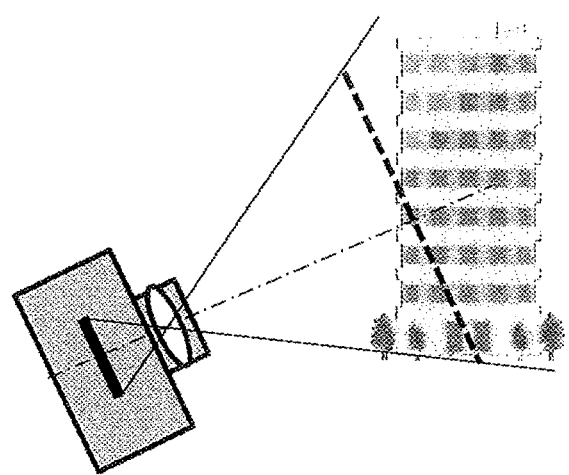
FIG. 17 shows an example in which tilt photography is performed.
Figure 18:
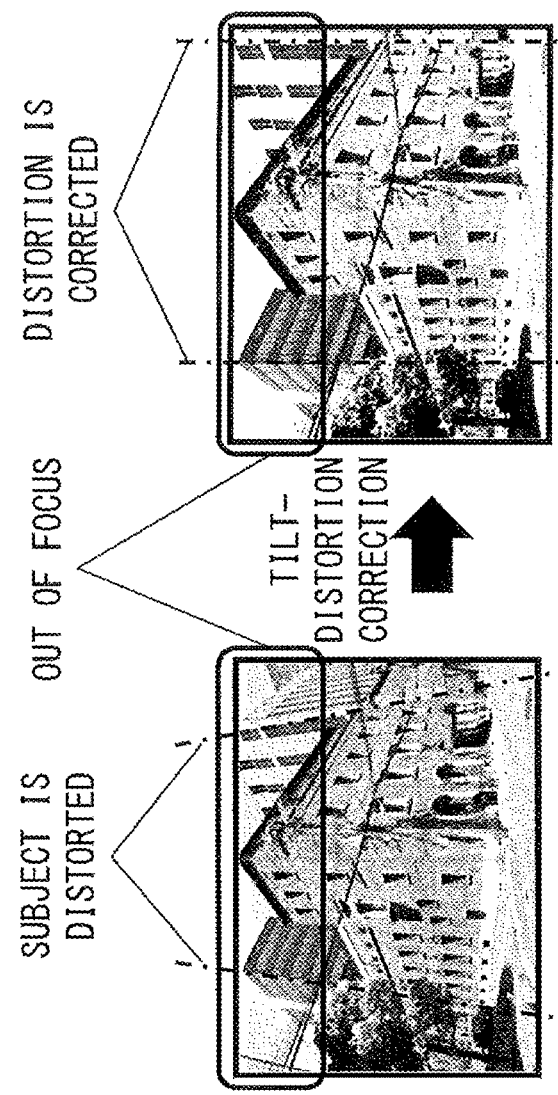
FIG. 18 shows an example in which a tilt-distortion correction is performed on an image that was obtained through tilt photography.

The tilt-distortion correction unit 206 performs a tilt-distortion correction in accordance with the set tilt-distortion correction level so as to correct distortion of the subject in the image represented by the image data. For example, the tilt-distortion correction unit 206 performs a tilt-distortion correction so as to correct distortion of the subject in the live view image represented by the live view image data and distortion of the subject in the image represented by synthesis image data generated by the depth synthesization process unit 207. Note that this distortion of the subject is caused when the image projection plane of the camera 1 is tilted with respect to the subject as shown in for example FIG. 17.

The depth synthesization process unit 207 performs a depth synthesization process so as to generate, from a plurality of pieces of focus bracket image data obtained through the focus bracket photography process etc., a synthesis image data that represents an image in which the entire subject is in focus.

The AE process unit 208 calculates the subject brightness by using image data (such as RAW image data). Note that the subject brightness may be measured by for example a dedicated photometric sensor.

The AF process unit 209 extracts signals of a high-frequency component from image data (such as RAW image data) and integrates the extracted signals of high-frequency component so as to obtain a focus evaluation value for AF.

The JPEG process unit 210 performs a JPEG compression process on image data and a JPEG decompression process on image data that received a JPEG compression process.

The microcomputer 211 executes a program stored in the flash memory 212 so as to control operations of the camera 1 (interchangeable lens 10 and the camera body 20). For example, the microcomputer 211 controls operations shown in FIG. 2, which will be described later.

The flash memory 212 stores a program executed by the microcomputer 211, data used for the execution of that program, etc.

The manipulation unit 213 corresponds to various types of manipulation members manipulated by the user. For example, the manipulation unit 213 includes up-arrow, down-arrow, left-arrow and right-arrow buttons, a release button, a play button, a menu button, a power button, etc. The up-arrow, down-arrow, left-arrow and right-arrow buttons are used for inputting setting instructions for the tilt-distortion correction level by the user, as will be described later by referring to FIG. 5. The release button is a two-step button having a halfway-pressed (first release) mode and a fully-pressed (second release) mode, and is used for inputting a photography preparation instruction and a photography instruction by the user. The play button is used for inputting a play instruction by the user. The menu button is used for inputting a menu window display instruction by the user. The power button is used for inputting turn-on/turn-off instructions by the user. Note that some or all of these buttons may be configured as a virtual manipulation unit that is manipulated through a touch panel.

The SDRAM 214 is a memory used as a working area etc., and temporarily stores for example data that is being processed (such as image data or other data).

The memory I/F 215 is an interface used by the microcomputer 211 etc. for accessing the recording medium 216.

The recording medium 216 is a memory card that is detachable from the camera body 20. This recording medium 216 records an image file etc. An image file is a file obtained by for example adding header information to image data that received JPEG compression by the JPEG process unit 210. Note that the recording medium 216 may be embedded in the camera body 20 (does not have to be detachable).

The monitor driver 217 is for example a display driver IC (Integrated Circuit), and converts image data (such as live view image data that received a tilt-distortion correction) into an image signal so as to output the image signal to the monitor 218.

The monitor 218 is for example a liquid crystal display (LED) panel, and displays an image (such as a live view image that received a tilt-distortion correction) in accordance with an image signal input from the monitor driver 217.

The bus 219 is a transfer line for transferring various types of pieces of data in the camera body 20.

In the camera 1 having this configuration, at least the focusing lens, the image sensor 202, the analog process unit 203 and the A/D conversion unit 204 are examples of an imaging unit that outputs image data. The manipulation unit 213 is an example of an input unit that inputs the tilt-distortion correction level. The tilt-distortion correction unit 206 is an example of a tilt-distortion correction image generation unit that generates tilt-distortion correction image data in accordance with the tilt-distortion correction level. The monitor 218 is an example of a display panel that displays the tilt-distortion correction image represented by the tilt-distortion correction image data. The function of part of the microcomputer 211 is an example of the live-view controller that repeatedly issues a series of instructions for making the imaging unit output image data, making the tilt-distortion correction image generation unit generate tilt-distortion correction image data on the basis of the image data, and making the display panel display the tilt-distortion correction image represented by the tilt-distortion correction image data. The function of different parts of the microcomputer 211 is an example of a focus bracket controller that instructs the focusing lens to move to each of a plurality of lens positions determined on the basis of the tilt-distortion correction level and that instructs the imaging unit to output image data when the focusing lens has moved to each of the plurality of lens positions.

Also, in the camera body 20, the analog process unit 203, the A/D conversion unit 204, the image process unit 205, the tilt-distortion correction unit 206, the depth synthesization process unit 207, the AE process unit 208, the AF process unit 209 and the JPEG process unit 210 for example are realized by electronic circuits such as an ASIC (Application Specific Integrated Circuit), an FPGA (Field Programmable Gate Array), etc.

Figure 2:
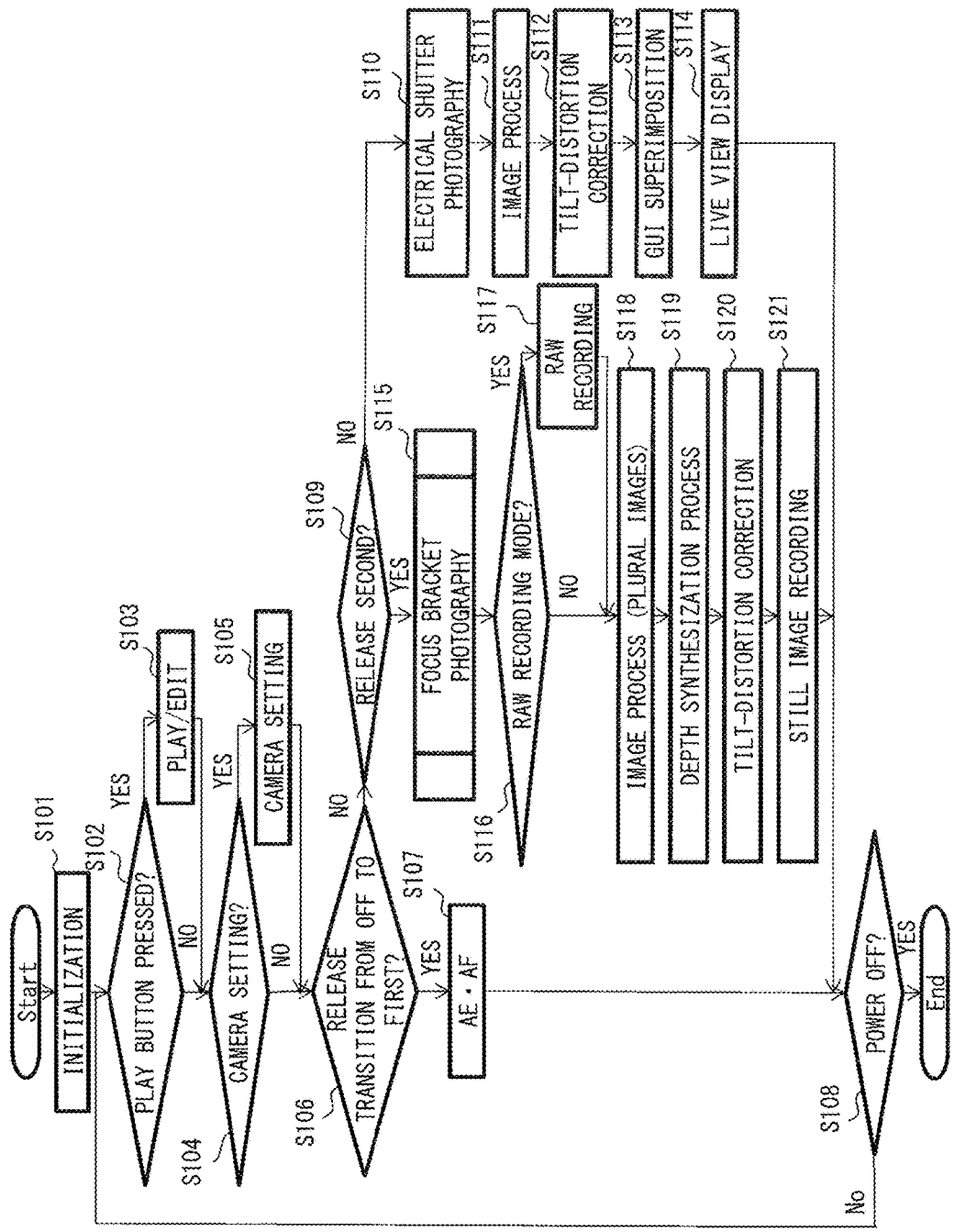
FIG. 2 is a flowchart showing an example of operations of the camera according to an embodiment.

FIG. 2 is a flowchart showing an example of operations of the camera 1.

These operations start when the power button included in the manipulation unit 213 is pressed so as to turn on the camera while the camera is in a power-off state.

As shown in FIG. 2, when these operations start, the microcomputer 211 first initializes the respective units of the camera 1 (S101).

Next, the microcomputer 211 determines whether or not the play button included in the manipulation unit 213 has been pressed (S102).

When the determination result is YES in S102, the microcomputer 211 performs playing of an image file (image data) recorded in the recording medium 216, editing of that image data, etc. in accordance with the manipulations on the manipulation unit 213 (S103). When the determination result is NO in S102, S103 is skipped.

Next, the microcomputer 211 determines whether or not a manipulation for a camera setting has been performed on the manipulation unit 213 (S104).

When the determination result is YES in S104, the microcomputer 211 performs camera setting in accordance with the manipulation on the manipulation unit 213 (S105). In this camera setting, the user can conduct setting of the tilt-distortion correction mode, the tilt-distortion correction level, the RAW recording mode, etc. However, the setting of the tilt-distortion correction level can be performed after the tilt-distortion correction mode is set. The method of setting the tilt-distortion correction level will be described later by referring to FIG. 5. When the determination result is NO in S104, S105 is skipped.

In the present example, it is assumed that the tilt-distortion correction mode is set in S105 after S104 in which the determination result is YES, and explanations will be given for the process after S105. Note that when the tilt-distortion correction mode has been set, the subsequent processes are performed on an assumption that the user will conduct tilt photography.

Next, the microcomputer 211 determines whether or not the release button included in the manipulation unit 213 has transitioned from the off state (the state in which it is not pressed) to a first release state (halfway-pressed state) (S106).

When the determination result is YES in S106, the microcomputer 211 performs the AE process and the AF process, which are photography preparation processes (S107). In the AE process, the microcomputer 211 makes the AE process unit 208 calculate the subject brightness so as to determine the ISO sensitivity, the F-number, and the shutter speed for the execution of a photography process in accordance with that subject brightness. Also, in the AF process, the microcomputer 211 makes the AF process unit 209 obtain the focus evaluation value and instructs the microcomputer 104 to drive the focusing lens in the photography lens 101 by a short distance at a time while evaluating the contrast on the basis of that focus evaluation value. When the contrast becomes the maximum, the microcomputer 211 instructs the microcomputer 104 to stop the driving of the focusing lens. An AF process as described above is an AF process based on a so-called contrast method. Note that a phase difference AF process may be performed as the AF process. Also, in this AF process, the SDRAM 214 for example stores information related to an image focus position, which indicates what position is in focus in the image.

Next, the microcomputer 211 determines whether or not the power button included in the manipulation unit 213 has been pressed (S108).

When the determination result is YES in S108, the power of the camera is turned off so as to terminate the present operation. Note that in the camera 1, when the power button is pressed with the power of the camera in an off state, the power of the camera is turned off. When the determination result is NO in S108, the process returns to S102.

Meanwhile, when the determination result is NO in S106, the microcomputer 211 determines whether or not the release button included in manipulation unit 213 has transitioned to a second state (fully-pressed state) (S109). Note that the case where the determination result is NO in S106 is a case where the release button is in an off state or a case where the release button has transitioned from an off state to a first release state and the first release state is thereafter maintained.

When the determination result is NO in S109, the microcomputer 211 starts processes for live view display (S110 through S114).

In this process, the microcomputer 211 first performs a photography process using an electronic shutter (the electronic shutter function of the image sensor 202) (S110). In this photography process, the microcomputer 211 makes the image sensor 202 perform imaging, makes the analog process unit 203 perform an analog process, and makes the A/D conversion unit 204 perform an A/D conversion and output RAW image data.

Next, the microcomputer 211 makes the image process unit 205 perform an image process on that RAW image data and generate live view image data (S111).

Next, the microcomputer 211 makes the tilt-distortion correction unit 206 perform, on that live view image data, a tilt-distortion correction in accordance with the set tilt-distortion correction level (S112).

Next, the microcomputer 211 superimposes a GUI (Graphical User Interface) on the live view image data (an example of tilt-distortion correction image data) on which that tilt-distortion correction was performed (S113). Note that the GUI is for example a slide bar, an icon, etc., which will be described later by referring to FIG. 5.

Next, the microcomputer 211 makes the monitor 218 display a live view image represented by the live view image data on which that GUI is superimposed (S114).

After S114, the process proceeds to S108.

When the determination result is YES in S109, the microcomputer 211 starts processes for recording a still image (S115 through S121).

In this process, the microcomputer 211 first performs a focus bracket photography process (S115). In this focus bracket photography process, the focusing lens in the photography lens 101 moves to a plurality of different lens positions and a photography process is performed at each of the lens positions so that a plurality of pieces of RAW image data are obtained, as will be explained later in detail by referring to FIG. 11.

Next, the microcomputer 211 determines whether or not the RAW recording mode is set (S116).

When the determination result is YES in S116, the microcomputer 211 records, in the recording medium 216, a plurality of pieces of RAW image data obtained in S115 (S117). When the determination result is NO in S116, S117 is skipped.

Next, the microcomputer 211 makes the image process unit 205 perform an image process on each of the plurality of pieces of RAW image data obtained in S115 and generate a plurality of pieces of focus bracket image data (S118).

Next, the microcomputer 211 makes the depth synthesization process unit 207 perform a depth synthesization process on the plurality of pieces of focus bracket image data and generate synthesis image data that represents an image in which the entire subject is in focus (S119).

Next, the microcomputer 211 makes the tilt-distortion correction unit 206 perform a tilt-distortion correction on the synthesis image data in accordance with the set tilt-distortion correction on the basis of the set tilt-distortion correction level (S120).

Next, the microcomputer 211 records, in the recording medium 216, the synthetic image data (an example of tilt-distortion correction image data) on which that tilt-distortion correction was performed (S121). However, when a plurality of pieces of RAW image data were recorded in S117, the synthetic image data on which the tilt-distortion correction was performed is recorded in association with the plurality of pieces of RAW image data.

After S121, the process proceeds to S108.

According to the flowchart shown in FIG. 2, when the determination results are NO in both S106 and S109 (when for example the release button is in an off state), the processes in S102 through S106, S109 through S114 (processes for live view display) and S108 are repeated. Accordingly, because when the user sets a tilt-distortion correction level, the live view image that received the tilt-distortion correction in accordance with that tilt-distortion correction level is displayed in the monitor 218 in this case, the user can adjust the tilt-distortion correction level to a desired level while looking at the live view image being displayed in the monitor 218.

Also, when the determination result becomes YES in S106 (when the release button transitions to a first release state from an off state), the process in S107 (photography preparation process) and the process in S108 are performed so that the process returns to S102.

When determination results become NO in S106 and YES in S109 (when the release button transitions to the second release state), the processes in S115 through S121 (processes for recording a still image) and the process in S108 are performed so that the process returns to S102.

Figure 3:
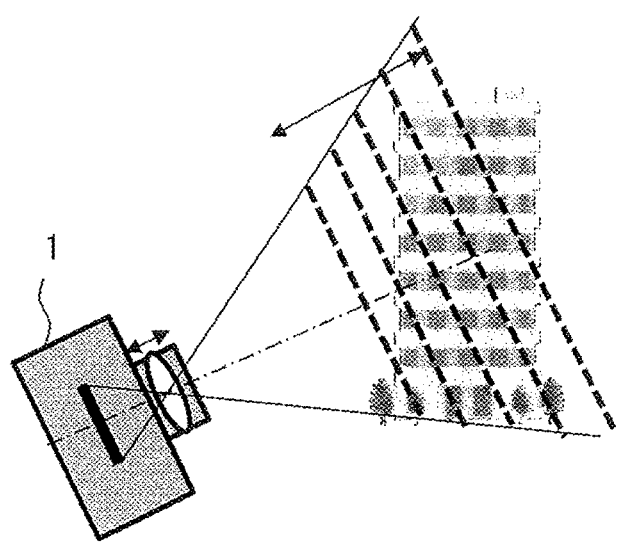
FIG. 3 is a first view schematically showing an example of S115 through S121 (processes for recording a still image)
Figure 4:
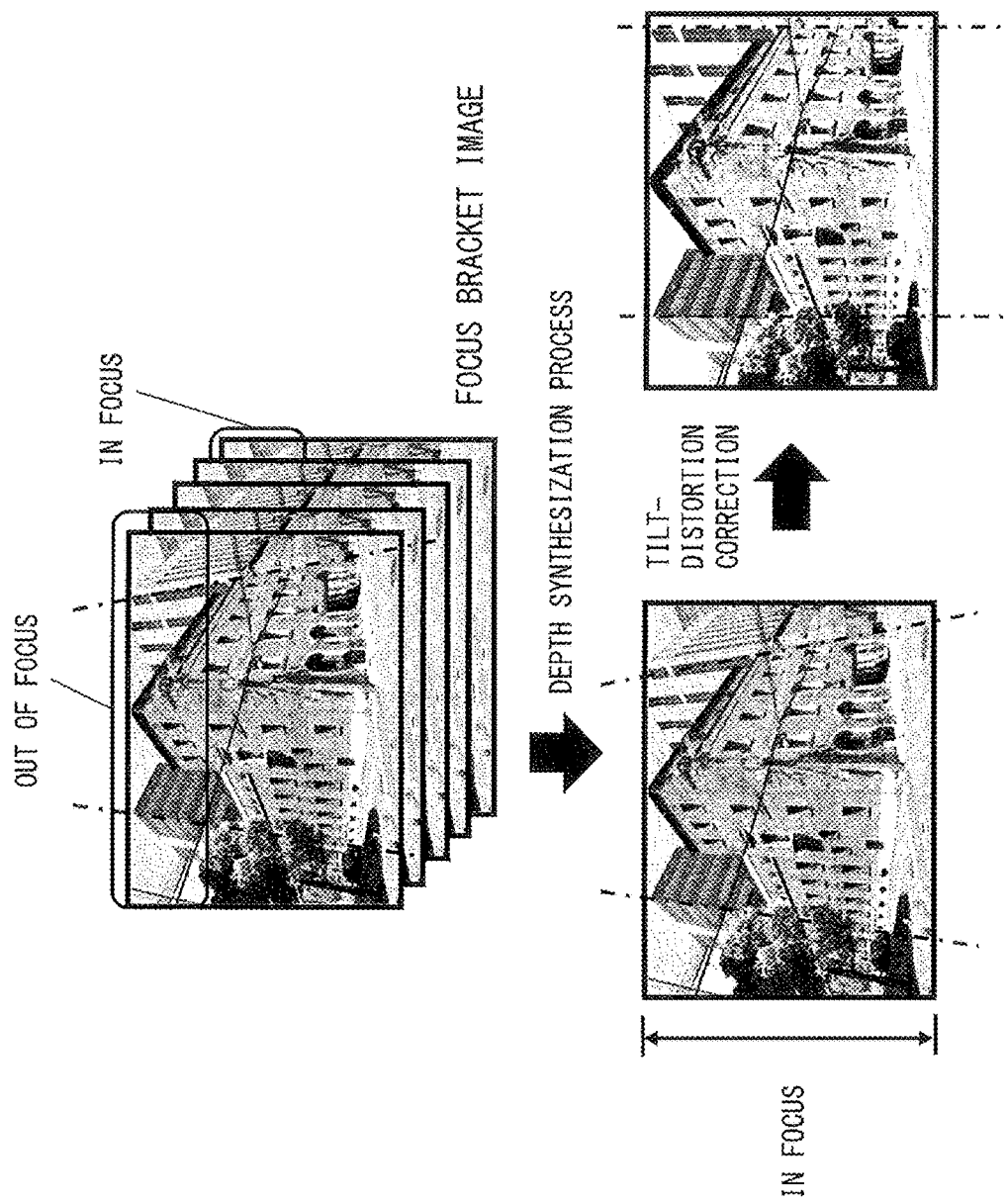
FIG. 4 is a second view schematically showing an example of S115 through S121 (processes for recording a still image)

FIG. 3 and FIG. 4 schematically show an example of S115 through S121 (processes for recording a still image).

In this process, as shown in FIG. 3, a focus bracket photography process first moves the focusing lens in the photography lens 101 to each of a plurality of different lens positions, and a photography process is performed at each of the lens positions so that a plurality of pieces of RAW image data are obtained.

Next, as shown in FIG. 4, an image process is performed on each of the plurality of pieces of RAW image data so that a plurality of pieces of focus bracket image data are generated. Note that the focus bracket image represented by each of the plurality of pieces of focus bracket image data is an image in which part of the subject is out of focus. Next, on the basis of the plurality of pieces of focus bracket image data, a depth synthesization process generates a synthetic image data that represents an image in which the entire subject is in focus. Thereby, the image represented by that synthetic image data is an image in which the entire subject is in focus. Next, a tilt-distortion correction is performed on that synthetic image data. Thereby, the image represented by the synthetic image data after the tilt-distortion correction is an image equivalent to a photography image obtained by the effect of the lens shift mechanism explained by referring to FIG. 19 and FIG. 20 (an image not involving distortion of the subject and having the entire subject in focus).

Figure 5:
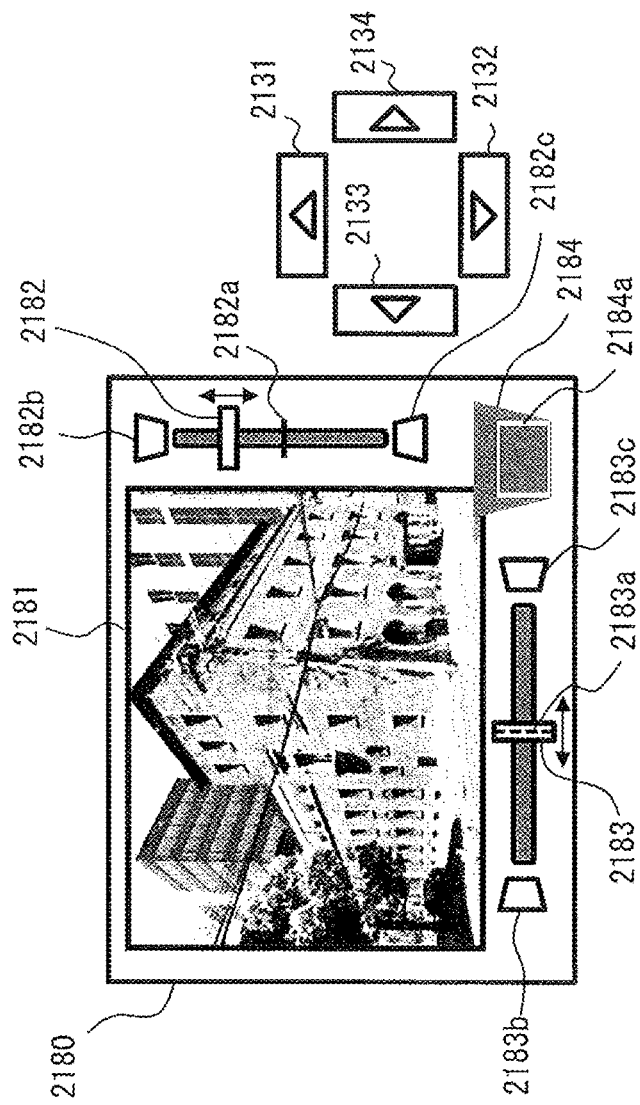
FIG. 5 shows a monitor window example displayed in a monitor when a tilt-distortion correction level is set.

FIG. 5 shows a monitor window example displayed in the monitor 218 when the tilt-distortion correction level is set in S105 above (S105 that is performed after S114).

As shown in FIG. 5, a monitor window 2180 then displays slide bars 2182, 2183 and an image shape 2184 after receiving the tilt-distortion correction, etc., together with a live view image 2181 after receiving the tilt-distortion correction in accordance with the tilt-distortion correction level set at that moment.

The slide bar 2182 is used for setting the tilt-distortion correction level in the vertical directions of the image. This slide bar 2182 moves upward and downward in accordance with the manipulations of an up-arrow button 2131 and a down-arrow button 2132 included in the manipulation unit 213, and the tilt-distortion correction level in the vertical directions of the image is set in accordance with the movement amount of the slide bar 2182 from a center position 2182a. In more detail, when the slide bar 2182 is at the center position 2182a, the tilt-distortion correction level in the vertical directions of the image is set to be zero, and with an increasing movement amount of the slide bar 2182 from the center position 2182a, the tilt-distortion correction level is set to be higher in the movement direction. Note that when the tilt-distortion correction level is set to zero, a tilt-distortion correction will not be performed. Also, a tilt-distortion correction level that has been set to be too high increases the degree of the tilt-distortion correction and a tilt-distortion correction level that has been set to be too low decreases the degree of the tilt-distortion correction. An icon 2182b displayed on the upper side of the slide bar 2182 displays the tendency of an image shape after receiving a tilt-distortion correction in a case when the slide bar 2182 has moved upward from the center position 2182a. An icon 2182c displayed on the lower side of the slide bar 2182 displays the tendency of the image shape after receiving a tilt-distortion correction in a case when the slide bar 2182 has moved downward from the center position 2182a.

The slide bar 2183 is used for setting a tilt-distortion correction level in the horizontal directions of the image.

This slide bar 2183 moves leftward and rightward in accordance with the manipulations of the left-arrow button 2133 and the right-arrow button 2134 included in the manipulation unit 213, and the tilt-distortion correction level in the horizontal directions of the image is set in accordance with the movement amount of the slide bar 2183 from a center position 2183*a* (which is depicted by dashed lines because it overlaps the slide bar 2183 in FIG. 5). In more detail, when the slide bar 2183 is at the center position 2183*a*, the tilt-distortion correction level in the horizontal directions of the image is set to be zero, and with an increasing movement amount of the slide bar 2183 from the center position 2183*a*, the tilt-distortion correction level is set to be higher in the movement direction. An icon 2183*b* displayed on the left side of the slide bar 2183 displays the tendency of an image shape after receiving a tilt-distortion correction in a case when the slide bar 2183 has moved leftward from the center position 2183*a*. An icon 2183*c* displayed on the right side of the slide bar 2183 displays the tendency of an image shape after receiving a tilt-distortion correction in a case when the slide bar 2183 has moved rightward from the center position 2183*a*.

The image shape 2184 after the tilt-distortion correction represents an image shape after receiving the tilt-distortion correction in accordance with the tilt-distortion correction level set at that moment. A rectangle 2184*a* in the image shape 2184 represents an area used for recording or displaying an image.

FIG. 6 schematically shows an example of a tilt-distortion correction table used when a tilt-distortion correction is performed in the processes in S112 and S120 described above. Note that this tilt-distortion correction table is stored in for example the flash memory 212.

As shown in FIG. 6, the tilt-distortion correction table stores "type", "tilt angle" and "projection transform formula" of tilt-distortion corrections corresponding to the tilt-distortion correction levels set in response to movements of the slide bar 2182 or the slide bar 2183 shown in FIG. 5. "Type" of a tilt-distortion correction corresponds to the icons 2182*b*, 2182*c*, 2183*b* and 2183*c* shown in FIG. 5. "Tilt angle" is a tilt angle that is to be corrected. "Projection transform formula" is a projection transform formula used for a tilt-distortion correction. Note in each projection transform formula that x and y are coordinates before a tilt-distortion correction and X and Y are coordinates after a tilt-distortion correction. Also, a, b, c, d, e, f, g, and h are projection transform parameters.

In the processes in S112 and S120 above, a projection transform formula corresponding to a set tilt-distortion correction level is selected from the above tilt-distortion correction table, a tilt-distortion correction is performed by using that projection transform formula, and tilt-distortion correction image data is generated.

Figure 7:
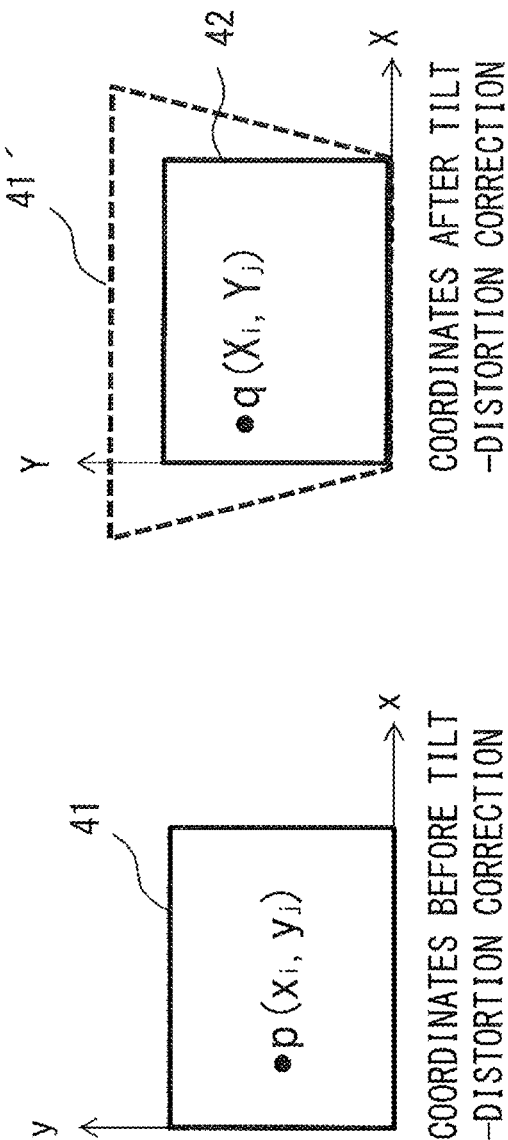
FIG. 7 shows an example of coordinates before and after a tilt-distortion correction.

FIG. 7 shows an example of coordinates before and after a tilt-distortion correction.

As shown in FIG. 7, coordinates p ($x_i, y_j$) in an image 41 before receiving a tilt-distortion correction will become for example coordinates q ($X_i, Y_j$) after receiving a tilt-distortion correction. In the above, i=0 through $P_x$ and j=0 through $P_y$. $P_x$ represents the length in the horizontal directions (corresponding to the number of pixels in the horizontal directions) of the image 41 and $P_y$ represents the length in the vertical directions (corresponding to the number of pixels in the horizontal directions) of the image 41.

Note that an image 41', which is enclosed by the dashed line, represents an image after a tilt-distortion correction and an area 42, enclosed by the sold line, in the image 41' represents an area that is used for recording or displaying an image.

Figure 8:
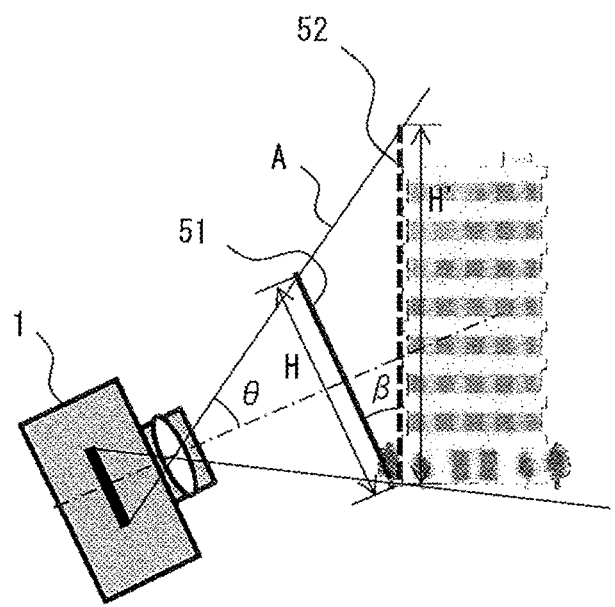
FIG. 8 is a first view that explains an example of a calculation method of eight projection transform parameters.
Figure 9:
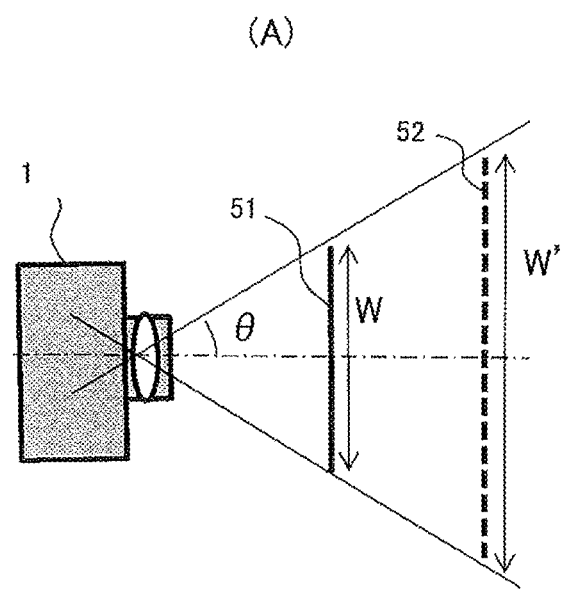
FIG. 9 is a second view that explains an example of the calculation method of eight projection transform parameters.
Figure 10:
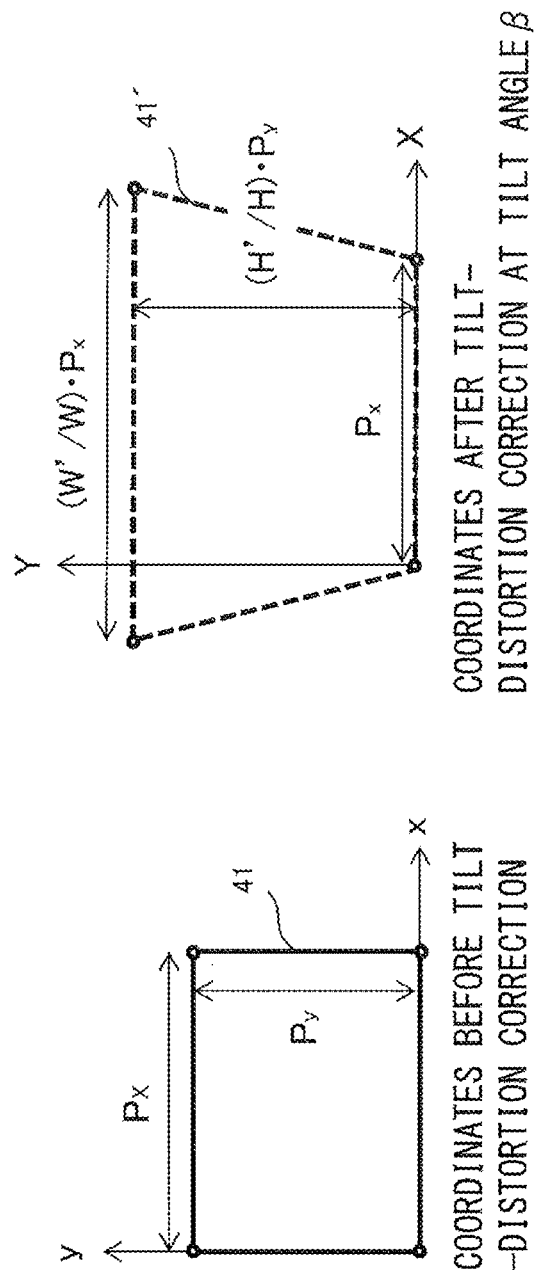
FIG. 10 is a third view that explains an example of the calculation method of eight projection transform parameters.

FIG. 8 through FIG. 10 explain an example of a calculation method of the above eight projection transform parameters. Note that FIG. 9 shows plane A of FIG. 8 seen from above.

It is assumed as shown in FIG. 8 that tilt photography was performed by using the camera 1 at tilt angle β with respect to the horizontal directions and a tilt-distortion correction is to be performed on tilt angle β. Note that tilt angle β corresponds to a tilt angle stored in the tilt-distortion correction table.

In such a case, vertical length H' of an image projection plane 52 after a tilt-distortion correction with respect to vertical length H of an image projection plane 51 before a tilt-distortion correction is obtained by equation (1) below.

[Equation 1]

$$\frac{H'}{H} = \frac{1}{\cos\beta - \sin\beta\tan\theta} \qquad \text{Equation (1)}$$

In the above equation, θ represents a photography angle of field, and is obtained by equation (2) below.

[Equation 2]

$$\theta = \frac{h}{2F} \qquad \text{Equation (2)}$$

In the above equation, h represents the size in the vertical directions of the image sensor 202 and F represents a focal length.

Also, as shown in FIG. 9, upper side length W' of the image projection plane 52 after a tilt-distortion correction with respect to upper side length W of the image projection plane 51 before a tilt-distortion correction is obtained by equation (3) below.

[Equation 3]

$$\frac{W'}{W} = \left(2\sin\beta\tan\theta \cdot \frac{H'}{H} + 1\right) \qquad \text{Equation (3)}$$

In such a case, as shown in FIG. 10, the upper side length (horizontal length) $P_x$ and vertical length $P_y$ of the image 41 before a tilt-distortion correction are represented by (W'/W)·$P_x$ and (H'/H)·$P_y$ in the image 41' after a tilt-distortion correction.

Accordingly, the above eight projection transform parameters can be obtained from a simultaneous equation consisting of eight equations on the basis of the positional relationships between the four vertex coordinates of the image 41 before a tilt-distortion correction and the four vertex coordinates of the image 41' after a tilt-distortion correction.

Figure 11:
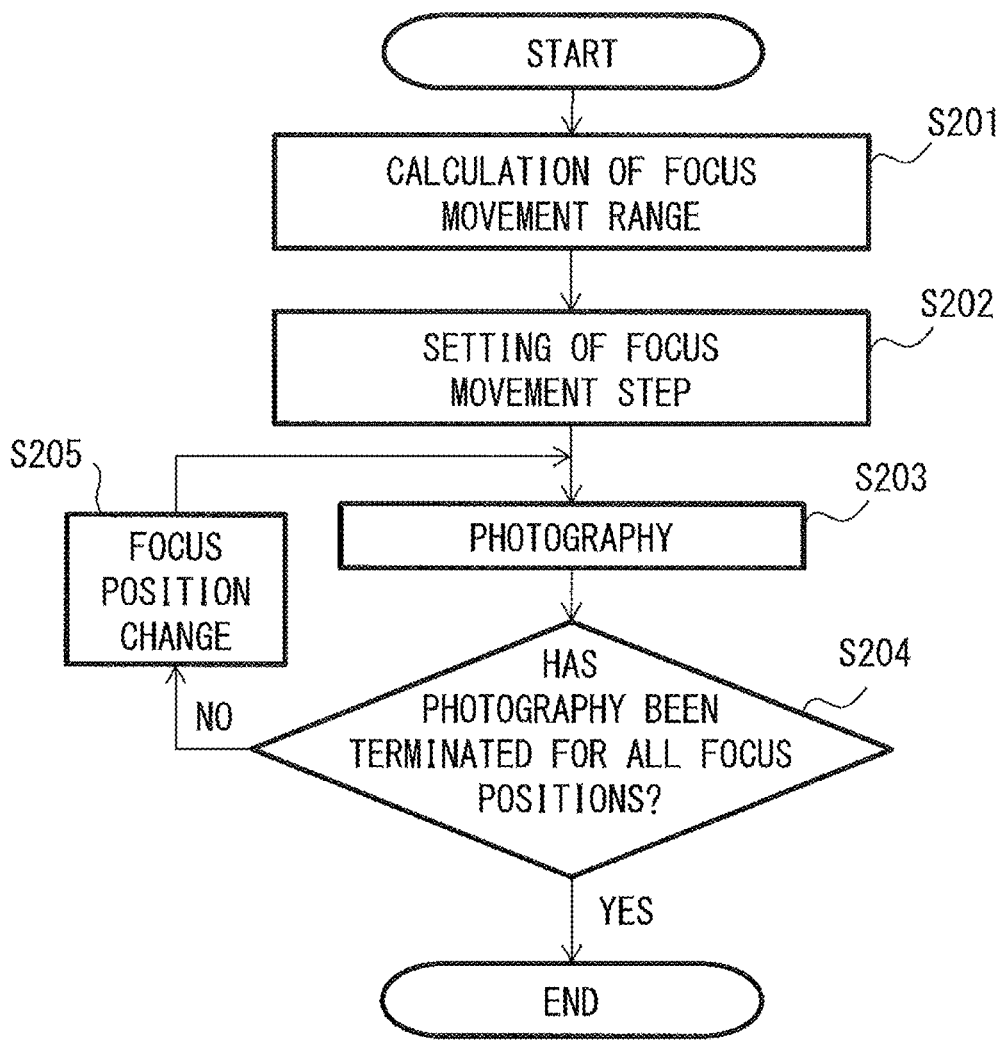
FIG. 11 is a flowchart showing an example of a focus bracket photography process.

FIG. 11 is a flowchart showing an example of the focus bracket photography process in S115 above.

In this process, as shown in FIG. 11, the microcomputer 211 calculates a focus movement range (corresponding to a movement range of the focusing lens in the photography lens 101), which will be described later by referring to FIG. 12 (S201).

Next, the microcomputer 211 sets a focus movement step (corresponding to a movement step of a focusing lens) on the basis of the diaphragm etc. during the photography process (S202). It is desired that this focus movement step be an interval narrower than the range of a depth of field that is determined by the state, such as the diaphragm etc., of the interchangeable lens 10 and the pixel pitch (permissible circle of confusion).

Next, the microcomputer 211 performs a photography process on each of a plurality of focus positions such as the nearest-side focus position and the farthest-side focus position in the focus movement range calculated in S201 and the focus position for each focus movement step set in S202 (S203 through S205).

In more detail, the microcomputer 211 first selects one of the above plurality of focus positions as a process target focus position, moves the focusing lens to the lens position corresponding to the process target focus position, and performs a photography process (S203). In this photography process, the microcomputer 211 makes the image sensor 202 perform an imaging process, makes the analog process unit 203 perform an analog process, and makes the A/D conversion unit 204 perform an A/D conversion and output RAW image data.

Next, the microcomputer 211 determines whether or not the photography processes on all focus positions have been terminated (whether or not all focus positions became process target focus positions) (S204).

When the determination result is NO in S204, the microcomputer 211 changes a process target focus position (treats, as a new process target focus position, a focus position that has not become a process target focus position) (S205), and the process returns to S203.

When the determination result in S204 is YES, the present process terminates (returns).

Note that while a plurality of focus positions are determined by the processes in S201 and S202 in the above focus bracket photography process, this also means that a plurality of lens positions (lens positions of the focusing lens) corresponding to the plurality of focus positions are determined.

Figure 12:
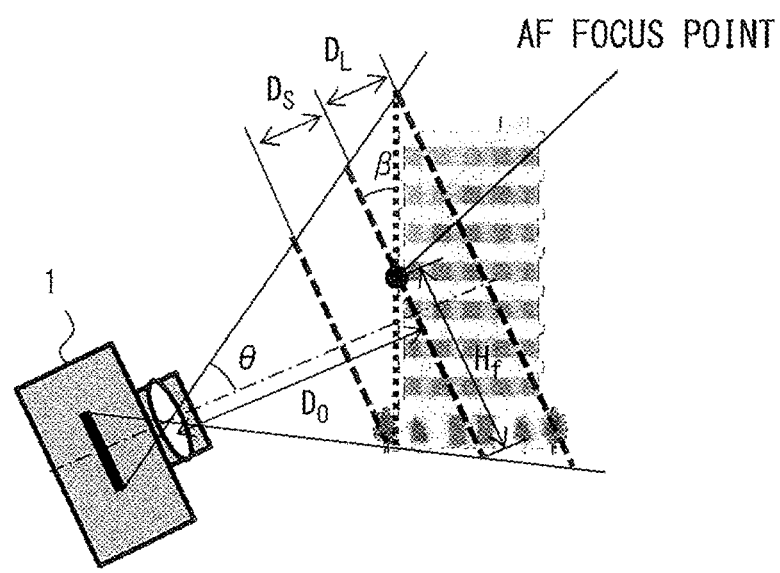
FIG. 12 explains an example of a calculation method of a focus movement range.

FIG. 12 explains an example of a calculation method of the above focus movement range.

In FIG. 12, θ represents a photography angle of field, and is obtained by equation (2) above.

β represents a tilt angle.

$D_o$ represents a subject distance of the AF focus point (focus point upon the AF process in S107 above).

$H_f$ is the image height of an AF focus point, and is obtained by equation (4) below.

[Equation 4]

$$H_f = \left(\frac{y_f}{P_y}\right) \cdot 2D_0 \tan\theta \quad \text{Equation (4)}$$

In the equation, $y_f$ represents the y coordinate (y coordinate of the image focus position represented by information on an image focus position stored in the SDRAM 214 in the AF process in S107 above) of the AF focus point in the image. $P_y$ is the vertical length of the image as described above.

In such a case, the focus movement range is represented as a range resulting from adding $D_S$ and $D_L$ by referring to the subject position at subject distance $D_0$ shown in FIG. 12.

$D_S$ is a range of nearest-side subject distances, and is obtained by equation (5).

[Equation 5]

$$D_S = \frac{H_f}{\left(\frac{1}{\tan\beta} - \tan\theta\right)} \quad \text{Equation (5)}$$

$D_L$ is a range of farthest-side subject distances, and is obtained by equation (6) below.

[Equation 6]

$$D_L = \frac{2D_0\tan\theta - H_f}{\left(\frac{1}{\tan\beta} - \tan\theta\right)} \quad \text{Equation (6)}$$

Note that the lens position of the focusing lens corresponding to Do can also be treated as a reference position for determining the plurality of lens positions described above.

Figure 13:
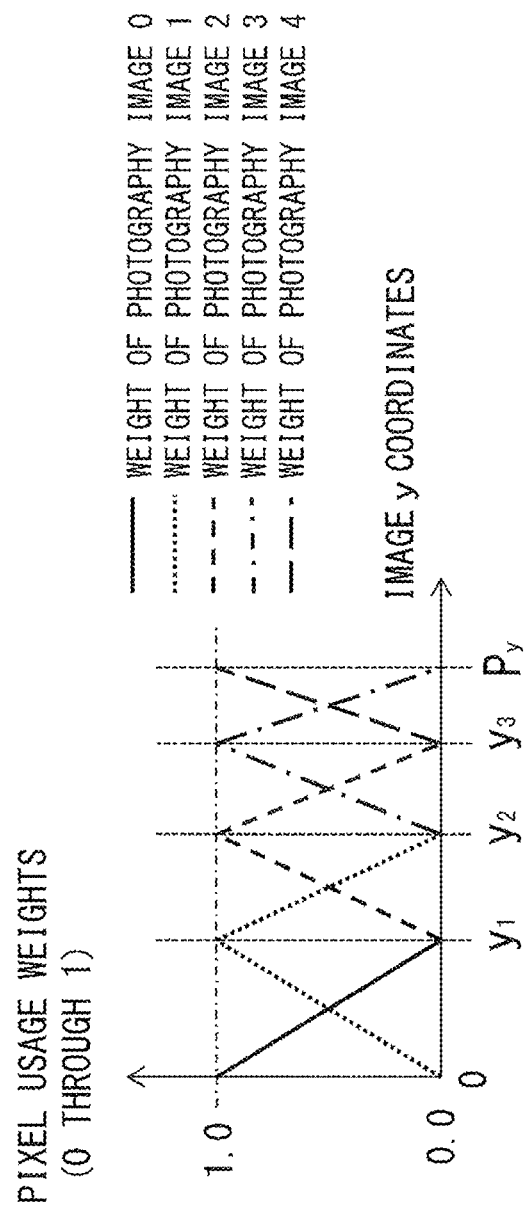
FIG. 13 is a first view that explains an example of a depth synthesization process.

FIG. 13 and FIG. 14 explain an example of the depth synthesization process in S119 above.

In FIG. 13, "photography image 0", "photography image 1", "photography image 2", "photography image 3" and "photography image 4" are images represented by a plurality of pieces of focus bracket image data that are targets of a depth synthesization process.

In FIG. 14, $D_0$ is the subject distance when the image data representing "photography image 0" is obtained. $D_1$ is the subject distance when the image data representing "photography image 1" is obtained. $D_2$ is the subject distance when the image data representing "photography image 2" is obtained. $D_3$ is the subject distance when the image data representing "photography image 3" is obtained. $D_4$ is the subject distance when the image data representing "photography image 4" is obtained. θ is a photography angle of field, and is obtained by equation (2) above. β represents a tilt angle.

In such a case, because tilt angle β is known from the set tilt-distortion correction level (only when the user has set the tilt-distortion correction level so that the image will have no distortion of the subject), areas in focus in photography images obtained at respective focus positions (subject distances) are obtained uniquely. Accordingly, in the depth synthesization process in S119 above, the pieces of image data representing the respective photography images receive weighted synthesization in accordance with the image positions (image Y coordinates in the present example) in the photography images so that synthetic image data representing an image in which the entire subject is in focus is obtained.

In more detail, this weighted synthesization assigns weights 0 through 1 to the respective pixels in the y directions of each photography image as shown in FIG. 13. In this example, for the pixels in the pixel areas between 0 through $y_1$ in the y directions, 1 through 0 are assigned as the weights of "photography image 0", 0 through 1 are assigned as the weights of "photography image 1", and θ is assigned as the weights of the other photography images. For the pixels in the pixel areas between $y_1$ through $y_2$ in the y directions, 1 through 0 are assigned as the weights of "photography image 1", 0 through 1 are assigned as the weights of "photography image 2", and 0 is assigned as the weights of the other photography images. For the pixels in the pixel areas between $y_2$ through $y_3$ in the y directions, 1 through 0 are assigned as the weights of "photography image 2", 0 through 1 are assigned as the weights of "photography image 3", and 0 is assigned as the weights of the other photography images. For the pixels in the pixel areas between $y_3$ through $P_y$ in the y directions, 1 through 0 are assigned as the weights of "photography image 3", 0 through 1 are assigned as the weights of "photography image 4", and 0 is assigned as the weights of the other photography images.

In this example, $y_1$, $y_2$ and $y_3$ are obtained by the equation (7) below.

[Equation 7]

$$y_i = \frac{\left(\frac{1}{\tan\beta} + \tan\theta\right) \cdot (D_i - D_0)}{2D_i \tan\theta} \cdot P_y \quad \text{Equation (7)}$$

In the above equation, i=1, 2, 3.

Figure 19:
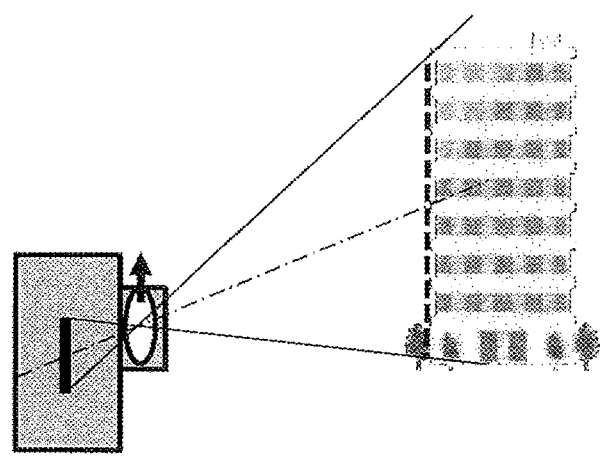
FIG. 19 shows an example in which photography is performed by a camera having a lens shift mechanism.
Figure 20:
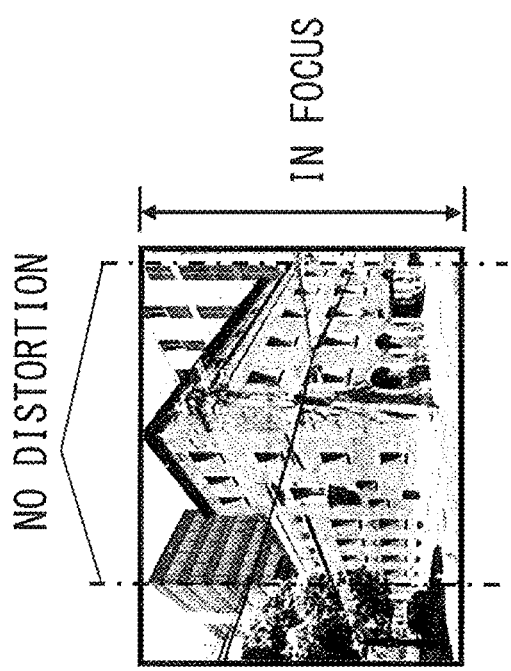
FIG. 20 shows an example of an image obtained by a camera having a lens shift mechanism.

Note that as the depth synthesization process in S119 above, a general depth synthesization process (for example the process described in Japanese Laid-open Patent Publication No. 2008-271240) may be employed. In such a case, however, it is necessary to pay attention to the following point. That is, while the depth synthesization process explained by referring to FIG. 13 and FIG. 14 will result in an image in which the entire subject is in focus (for example an image in which a building is in focus), a general depth synthesization process will result in an image in which all portions of the image are in focus (for example an image in which not only the building but also the other portions are in focus). Needless to say therefore, when an image equivalent to a photography image obtained by the effect of the lens shift mechanism explained in FIG. 19 and FIG. 20 is desired, it is better to adopt the depth synthesization process explained by FIG. 13 and FIG. 14.

As described above, the present embodiment performs a tilt-distortion correction in accordance with a tilt-distortion correction level set by the user so that the user can obtain an image in which the entire subject is in focus just by the user performing photography after adjusting the tilt-distortion correction level while looking at the live view image. Also, because a plurality of focus positions in a focus bracket photography process performed then are automatically determined by the camera 1 without the necessity of particular manipulations performed by the user, the user does not have to pay attention to the depth range of the subject etc. while performing photography.

Note that the present embodiment permits modifications as follows.

For example, the operations of the camera 1 shown in FIG. 2 may be modified as follows.

Figure 15:
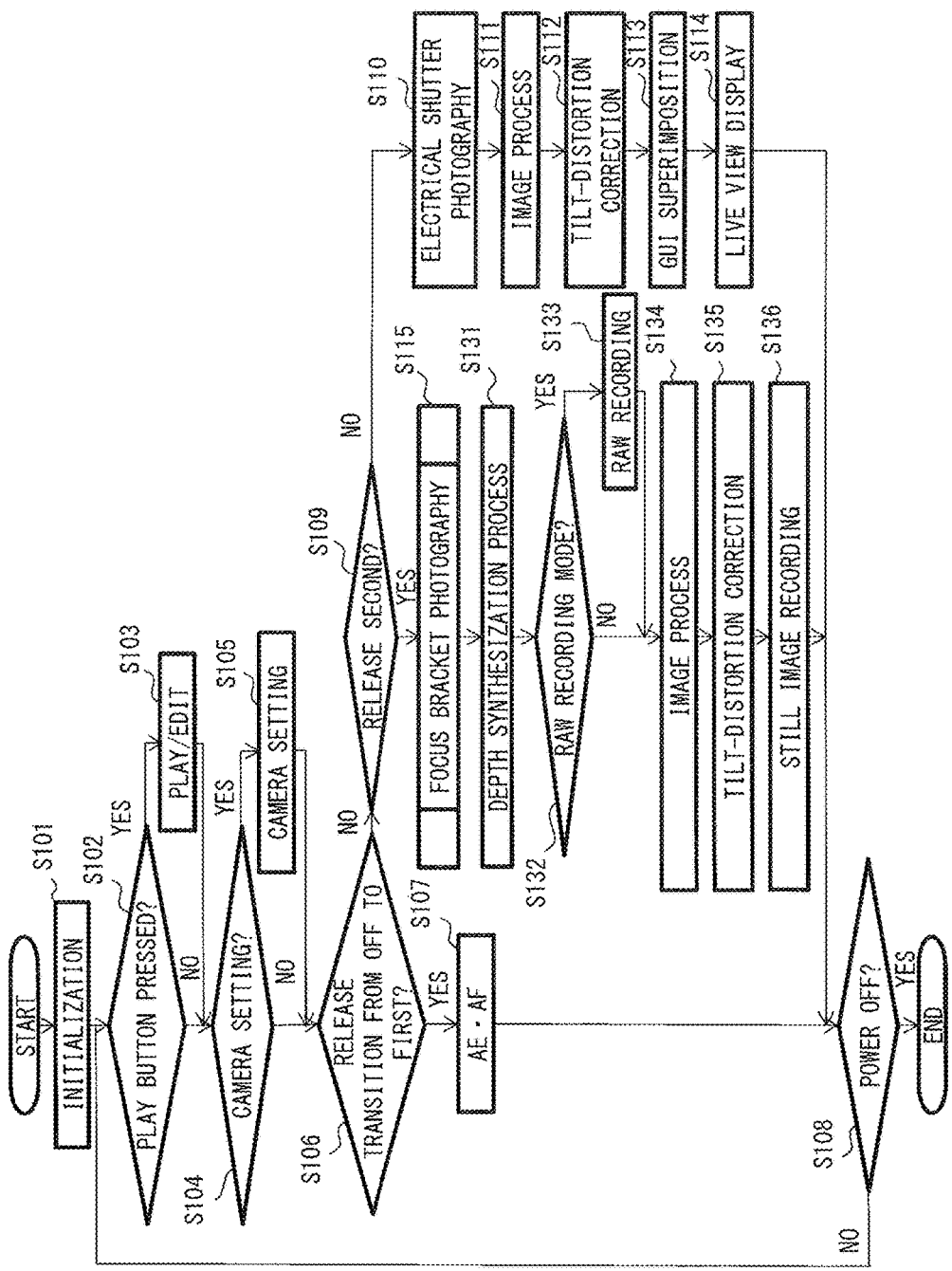
FIG. 15 is a flowchart showing a modification example of operations of the camera according to an embodiment.

FIG. 15 is a flowchart showing a modification example of operations of the camera 1.

As shown in FIG. 15, the present modification example performs a depth synthesization process (S131) after the microcomputer 211 performs the focus bracket photography process (S115). In this depth synthesization process, the microcomputer 211 makes the depth synthesization process unit 207 perform a depth synthesization process on a plurality of pieces of RAW image data obtained in the focus bracket photography process so that synthetic RAW image data that represents an image in which the entire subject is in focus is generated.

Next, the microcomputer 211 determines whether or not the RAW recording mode is set (S132).

When the determination result is YES in S132, the microcomputer 211 records, in the recording medium 216, synthetic RAW image data generated in S131 (S133). When the determination result is NO in S132, S133 is skipped.

Next, the microcomputer 211 makes the image process unit 205 perform an image process on the synthetic RAW image data generated in S131 so that to-be-recorded image data is generated (S134).

Next, the microcomputer 211 makes the tilt-distortion correction unit 206 perform a tilt-distortion correction in accordance with the set tilt-distortion correction level on that to-be-recorded image data (S135).

Next, the microcomputer 211 records, in the recording medium 216, the to-be-recorded image data that received the tilt-distortion correction (S136). However, when synthetic RAW image data has been recorded in S133, the image data that received the tilt-distortion correction is recorded in association with that piece of synthetic RAW image data.

The other processes shown in FIG. 15 are similar to those shown in FIG. 2.

According to a modification example as described above, it is possible to record, in the recording medium 216, synthetic RAW image data having the entire subject in focus by setting the RAW recording mode. Note that this modification example may be configured to further allow the user to edit the synthetic RAW image data recorded in the recording medium 216 in S103 in FIG. 15. In such a case, it may be possible to permit a tilt-distortion correction in accordance with a desired tilt-distortion correction level as editing of synthetic RAW image data.

Figure 16:
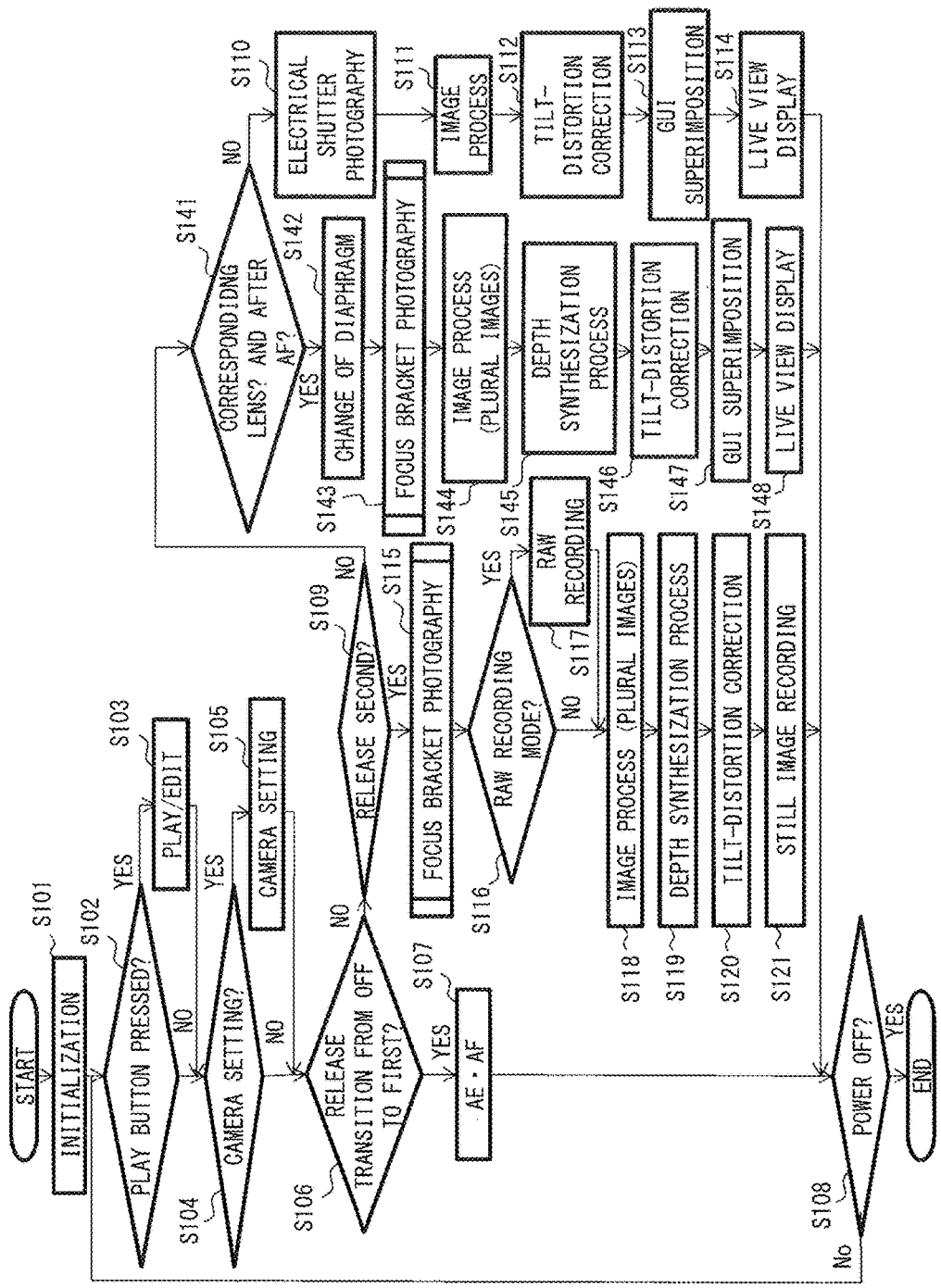
FIG. 16 is a flowchart showing another modification example of operations of the camera according to an embodiment.

FIG. 16 is a flowchart showing another modification example of operations performed by the camera 1.

As shown in FIG. 16, according to this modification example, when the determination result is NO in S109, the microcomputer 211 determines whether or not the interchangeable lens 10 is a corresponding lens and that point in time is a point in time after the execution of the AF process in S107 (S141). Note that a corresponding lens is an interchangeable lens that is configured to be able to move the focusing lens at high speeds.

When the determination result is NO in S141, the process proceeds to S110 so as to start the process for the above live view display (S110 through S114).

When the determination result is YES in S141, the microcomputer 211 starts the processes for different live view displays (S142 through S148).

In this process, the microcomputer 211 first changes the set diaphragm condition by for example increasing the F-number or by performing other operations so that the depth of field becomes greater (S142).

Next, the microcomputer 211 performs a focus bracket photography process (S143). While the focus bracket photography process performed then is as shown in FIG. 11, because the diaphragm condition has been set so that the depth of field becomes greater in S142, a greater value is set as the focus movement step in S202 in FIG. 11. This reduces the number of photography processes in the focus bracket photography process, leading to a smaller number of pieces of RAW image data that are obtained.

Next, the microcomputer 211 makes the image process unit 205 perform an image process on each of a plurality of pieces of RAW image data obtained in S143 so as to generate a plurality of pieces of live view image data (S144).

Next the microcomputer 211 makes the depth synthesization process unit 207 perform a depth synthesization process on those plurality of pieces of live view image data so as to generate synthetic live view image data of an image in which the entire subject is in focus (S145).

Next, the microcomputer 211 makes the tilt-distortion correction unit 206 perform a tilt-distortion correction in accordance with a set tilt-distortion correction level on that synthetic live view image data (S146).

Next, the microcomputer 211 superimposes a GUI (a GUI similar to that in S113) on the synthetic live view image data on which that tilt-distortion correction was performed (S147).

Next, the microcomputer 211 makes the monitor 218 display a synthetic live view image represented by the synthetic live view image data on which that GUI has been superimposed (S148).

After S148, the process proceeds to S108.

The other processes shown in FIG. 16 are similar to those in FIG. 2.

The modification example as described above makes it possible to make the monitor 218 display a live view image that is an image in which the entire subject is in focus and that is an image on which a tilt-distortion correction has been performed, when the determination result is YES in S141. Note that the process in S142 may also be omitted in this modification example when there is no possibility of process delay.

Also, while the present embodiment uses an example in which a tilt-distortion correction is performed on the basis of a tilt-distortion correction level set by the user, a tilt-distortion correction may be performed in accordance with a tilt detected by a sensor by for example providing a sensor for detecting the tilt of the camera 1 (for example a gyro sensor) to the camera 1.

The above embodiments are just specific examples of the present invention for facilitating understanding of the present invention, and the present invention is not limited to the above embodiments. The present invention allows various modifications and changes without departing from the spirit of the present invention, which is defined in the claims.

What is claimed is:

1. An imaging device comprising:
an imaging unit that is configured to output image data and that includes:
a focusing lens configured to move so as to form a subject image;
an image sensor configured to image a formed subject image so as to output an image signal; and
a signal converter configured to convert the image signal into image data,
a tilt-distortion correction image generation circuit configured to generate tilt-distortion correction image data in accordance with a tilt-distortion correction level received as a user input;
a display panel configured to display a tilt-distortion correction image represented by the tilt-distortion correction image data;
a live-view controller configured to issue a series of instructions for making the imaging unit output image data, making, on the basis of the image data, the tilt-distortion correction image generation circuit generate tilt-distortion correction image data, and making a display panel display a tilt-distortion correction image represented by the tilt-distortion correction image data; and
a focus bracket controller configured to instruct the focusing lens to move to each of a plurality of lens positions determined on the basis of the tilt-distortion correction level and instruct the imaging unit to output image data when the focusing lens has moved to each of the plurality of lens positions.

2. The imaging device according to claim 1, further comprising:
a synthetic image generation circuit configured to generate synthetic image data that represents an image in which an entire subject is in focus, wherein
the focus bracket controller further instructs the synthetic image generation circuit to generate synthetic image data on the basis of a plurality of pieces of image data output from the imaging unit at each of the plurality of lens positions and instructs the tilt-distortion correction image generation circuit to generate tilt-distortion correction image data on the basis of the synthetic image data.

3. The imaging device according to claim 2, wherein
the synthetic image generation circuit generates the synthetic image data on the basis of a plurality of image areas determined based on a tilt angle in accordance with the tilt-distortion correction level and a subject distance in accordance with each of the plurality of lens positions and also on the basis of weights assigned to the plurality of respective pieces of image data in respective pixel areas in each of the plurality of image areas.

4. The imaging device according to claim 1, wherein
the plurality of lens positions are determined on the basis of a reference position and a tilt angle in accordance with the tilt-distortion correction level, the reference position being a lens position of the focusing lens adopted when a subject is brought into focus.

5. A control method of an imaging device, the method comprising:
inputting a tilt-distortion correction level;
performing live view control in which control of imaging a subject image formed by a focusing lens so as to output image data, generating tilt-distortion correction image data in accordance with the tilt-distortion correction level on the basis of the image data, and displaying a tilt-distortion correction image represented by the tilt-distortion correction image data is performed repeatedly; and
performing focus bracket control in which control of moving the focusing lens to each of a plurality of lens positions determined on the basis of the tilt-distortion correction level and imaging a subject image formed by the focusing lens so as to output image data when the focusing lens has moved to each of the plurality of lens positions is performed.

6. A non-transitory computer-readable recording medium storing a computer program for causing a computer of an imaging device to implement:
an input function of inputting a tilt-distortion correction level of an image;
a live view control function of repeatedly performing control of imaging a subject image formed by a focusing lens so as to output image data, generating tilt-distortion correction image data in accordance with the tilt-distortion correction level on the basis of the image data, and displaying a tilt-distortion correction image represented by the tilt-distortion correction image data; and
a focus bracket control function of performing control of moving the focusing lens to each of a plurality of lens positions determined on the basis of the tilt-distortion correction level and imaging a subject image formed by the focusing lens so as to output image data when the focusing lens has moved to each of the plurality of lens positions.

\* \* \* \* \*